United States Patent [19]
Mahato et al.

[11] Patent Number: 4,656,706
[45] Date of Patent: Apr. 14, 1987

[54] FORMATION EFFICIENCY OF POSITIVE PLATES OF A LEAD-ACID BATTERY

[75] Inventors: Basanta K. Mahato, Brown Deer; William C. Delaney, Saukville, both of Wis.

[73] Assignee: Globe-Union, Inc., Milwaukee, Wis.

[21] Appl. No.: 816,257

[22] Filed: Jan. 6, 1986

[51] Int. Cl.$^4$ .................. H01M 4/56; B23P 13/00
[52] U.S. Cl. ........................... 29/2; 429/228; 423/619; 204/2.1
[58] Field of Search ............. 429/228; 29/2; 423/619; 204/2.1

[56] References Cited
U.S. PATENT DOCUMENTS 4,140,589  2/1979  Hradcovsky et al. ............. 204/2.1
4,388,210  6/1983  Parker ............................ 429/288 X Primary Examiner—Brian E. Hearn
Assistant Examiner—Stephen J. Kalafut
Attorney, Agent, or Firm—Joseph J. Jochman; Larry L. Shupe

[57] ABSTRACT

The formation efficiency of pasted positive plates of a lead-acid battery is greatly enhanced by providing in situ a layer of lead dioxide ($PbO_2$) on the pasted plate surfaces prior to formation. The $PbO_2$ layer is preferably formed by treating the surfaces of the plates with an ozone-enriched gas to convert a portion of the poorly conductive positive active precursor material ($nPbO \cdot PbSO_4$) to electrically conductive $PbO_2$. In subsequent electrochemical formation of the plates, the total formation charge can be reduced significantly while obtaining more complete conversion of the paste to positive active material. The method also provides an effective substitute for conventional curing of pasted positive plates.

10 Claims, No Drawings

FORMATION EFFICIENCY OF POSITIVE PLATES OF A LEAD-ACID BATTERY

BACKGROUND OF THE INVENTION

The present invention relates to lead-acid storage batteries and, more particularly, to the treatment of pasted positive plates for such batteries to enhance the formation and initial performance efficiencies thereof.

In the preparation of the positive plates for a lead-acid battery, an active material paste is prepared from a mixture of lead oxide (PbO) containing a significant amount of metallic lead, sulfuric acid and water (along with various other well known additives). As a result of the chemical reaction during mixing, a portion of the lead and PbO is initially converted to lead sulfate (PbSO$_4$) and the resultant positive active precursor paste comprises a heterogeneous mixture of lead, lead sulfate and basic lead sulfate (nPbO.PbSO$_4$).

The precursor paste is applied to conductive lead grids and the freshly pasted plates are then typically cured to stabilize the precursor material and to enhance the strength and handleability of the plates for further processing. A cell element comprising a stack of alternately disposed positive plates and similarly prepared negative plates, between each of which is placed a separator, is then prepared. The cell elements are assembled in a battery container, interconnected in various manners well known in the art, and the assembled battery, filled with dilute sulfuric acid electrolyte, is electrochemically "formed" or initially charged by conversion of the positive and negative active precursor materials to lead dioxide (PbO$_2$) and lead, respectively.

It is known that the formation efficiency of a lead-acid battery, that is, the extent of the conversion of the active precursor materials in relation to the applied current and duration of charge, is generally positive plate dependent. In particular, the conversion of PbSO$_4$ to PbO$_2$ in the positive active material is the most difficult to attain, due in part to the greater electrical potential required as compared to that needed for conversion of the other compounds in the positive paste materials. It is also known that in a typical pasted positive electrode, the formation of PbO$_2$ from the heterogeneous paste mixture begins at the interface between the conductive lead grid and the paste and extends first into the cores of the paste pellets which fill the grid network. The conversion or formation eventually proceeds to the outer plate surfaces, that material being the last to be formed.

The inherent inefficiency of the formation process requires an actual formation charge greatly in excess of the theoretical, typically greater than 165% of the theoretical charge of 100 amp-hours/pound of positive paste material. The formation inefficiency is due primarily to the following factors: (i) the high resistivity of the positive active paste material; (ii) high current density at the conductor (grid)/paste interface which creates a potential sufficient to hydrolyze water and evolve hydrogen and oxygen; and (iii) temperature rises, especially during formation at higher current rates.

Notwithstanding the application of formation charges greatly in excess of the theoretical requirement, the typical formation of lead-acid batteries still often results in two serious deficiencies. First, the performance of lead-acid batteries immediately after formation (measured, for example, by the reserve discharge capacity) is often below the specified requirement. As a result, batteries must be "boosted" or cycled one or more times by discharge and recharge to bring them up to specified performance levels. Second, formed batteries often experience significant open circuit losses in capacity through self-discharge, even over relatively short periods. Both deficiencies are believed to be caused by the incomplete conversion of the PbO.PbSO$_4$ paste material to PbO$_2$ during formation.

The prior art discloses attempts to enhance the conductivity and hence the formation efficiency of positive active precursor pastes in lead-acid batteries. Thus, it is known to add conductive graphite fibers to the paste mix. However, graphite is unstable in the highly oxidizing environment of the positive electrode making the use of this material unsatisfactory. Another prior art approach is disclosed in U.S. Pat. No. 4,388,210 wherein ozone gas is used to generate a high surface area lead oxide and to oxidize a portion of the lead oxide in a hydrogen bonding solvent to form lead dioxide with increased surface area and electrical conductivity. The lead dioxide so produced is proposed for use as a component in preparing the active material paste, with the enhanced electrical conductivity promoting formation and the increased surface area improving active material utilization in the operation of the battery. However, in typical paste mixing procedure, the dilute sulfuric acid (H$_2$SO$_4$) reacts with the lead dioxide particles to form surface layers of non-conductive lead sulfate thereon, thereby diminishing the electrical conductivity and the corresponding benefit in promoting formation.

U.S. Pat. No. 2,658,097 describes a method of treating pasted positive plates in an aqueous alkaline oxidizing solution to form on the plate surfaces a thin layer of lead oxide to promote accelerated formation and to allow the use of a higher specific gravity acid electrolyte for the formation process. However, the disclosed lower end-of-formation specific gravity of the forming electrolyte indicates that the positive plates are not completely formed, since it is well known in the art that a higher end-of-formation specific gravity is directly indicative of complete formation. In addition, the highly alkaline treatment solution has the potential to cause undesirable corrosion of the lead alloy plate grids.

SUMMARY OF THE INVENTION

In the present invention, there is disclosed a method for increasing the electrical conductivity of the positive active precursor material after the paste has been mixed and appplied to the grids. The method comprises an in situ oxidation of the pasted positive plate surfaces to convert a portion of the non-conductive or poorly conductive paste material to conductive lead dioxide (PbO$_2$). The conductive surface matrix so provided results in a more uniform and direct distribution of the charging current to the paste material during formation, thereby greatly enhancing the formation efficiency of the positive plates.

In the preferred embodiment, the pasted plates are treated in an ozone-enriched oxygen atmosphere by passing the oxidizing gas over the plate surfaces in a chamber at ambient conditions of temperature and pressure. Since the oxidation treatment is effected after the paste is mixed and applied to the grids and the layer of PbO$_2$ so formed is unaffected by any subsequent processing steps, the full benefit of the conductive layer is available for enhanced distribution of the formation current over the surfaces of the positive active precursor material in the plates.

The method allows typical formation time and applied current to be reduced considerably and results in more completely formed positive plates. Plates so formed are found to meet applicable performance specifications immediately after formation, to be less susceptible to self-discharge, and to exhibit improved initial active material utilization. In addition, the oxidation treatment improves handleability of the freshly pasted plates such that subsequent standard curing of the plates may be eliminated entirely.

DESCRIPTION OF THE PREFERRED EMBODIMENTS

To demonstrate the effectiveness of ozone treatment of pasted positive plates in enhancing the formation efficiency, a series of tests was conducted on two sets of automotive batteries, each identically constructed except that the cured positive plates of one set were treated prior to formation with an ozone-enriched oxygen gas stream. The concentration of ozone in the oxygen gas was 3% by weight (33 mg $O_3$/liter) and the exposure time was 30 minutes. Table I shows the formation characteristics of the two groups of test batteries containing standard and ozone-treated positive plates, respectively. Also shown are the specification and actual post-formation performance data for both groups of batteries using industry standard BCI test procedures.

needed for complete formation. Cold cranking capacity is known to be negative electrode limited and, therefore, the similarity in performance between the standard and ozone treated batteries after an initial reserve capacity discharge and recharge is as would be expected.

The end-of-formation acid electrolyte concentration, shown in Table I, is also indicative of the formation efficiency. The higher end-of-formation specific gravity of the electrolyte in batteries having ozonated positive plates indicates a more complete conversion of the heterogeneous paste mixture of $PbSO_4$ and $nPbO \cdot PbSO_4$ to $PbO_2$ and, therefore, more complete formation.

Another problem associated with incomplete formation or poor formation efficiency is the open circuit loss of capacity of batteries allowed to stand for a period of time after formation. To illustrate this problem, two additional groups each comprising four 12-volt automotive batteries were built and tested; the batteries of each group were of identical construction, except that the positive plates of one group were treated in an ozone enriched oxygen atmosphere and the formation charge for those batteries was reduced by approximately 10% from the charge used for the standard batteries. The formation characteristics and post-formation test data for both groups are shown in Table II.

TABLE I

|  | STD. BATTERIES | BATTERIES WITH OZONATED POSITIVES |
|---|---|---|
| FORMATION DATA |  |  |
| INITIAL ACID CONC., s.g. | 1.240 | 1.240 |
| FORMATION TIME, hrs. | 8.7 | 6.9 |
| FORMATION CHARGE, Ah | 172.85 | 136.94 |
| ENDING ACID CONC., s.g. | 1.245 | 1.270 |
| PERFORMANCE SPEC. |  |  |
| RESERVE CAPACITY, min. (Discharge at 25 A, 80° F. to 10.5 V) | 119 | 119 |
| COLD CRANK CAPACITY, sec. (Discharge at 525 A, 0° F. to 7.2 V) | 30 | 30 |
| TEST DATA |  |  |
| 1st RESERVE CAPACITY, min. | 60.5 | 107 |
| 1st COLD CRANK CAPACITY, sec. | 68 | 63 |
| 2nd RESERVE CAPACITY, min. | 134.5 | 130 |
| 2nd COLD CRANK CAPACITY, sec. | 69 | 68 |
| 3rd RESERVE CAPACITY, min. | 137.5 | 135 |

The test data in Table I show the dramatic increase in formation efficiency in batteries utilizing ozone-treated positive plates. The formation time and total formation charge for the batteries with ozonated positive plates were reduced by over 20% as compared to the standard formation and yet the initial reserve capacity exceeds that of the standard formed batteries by more than 75%. The first reserve capacity of the test batteries using the ozone treatment of the present invention approaches within a few percent the initial reserve capacity specification. In comparison, the standard formed batteries fall far short of the reserve capacity requirement and, as shown in Table I, require a subsequent charge to meet this specification. The reserve capacities of both groups of batteries are comparable after the initial discharge tests and recharge. Most significant, however, is the very substantial reduction in formation charge required for the batteries having ozone-treated positive plates and the consequent saving in electic power and time

TABLE II

|  | STD. BATTERIES | BATTERIES WITH OZONATED POSITIVES |
|---|---|---|
| FORMATION DATA |  |  |
| INITIAL ACID CONC., s.g. | 1.240 | 1.240 |
| FORMATION TIME, hrs. | 10.8 | 9.45 |
| FORMATION CHARGE, Ah | 161.2 | 142.4 |
| ENDING ACID CONC., average s.g. | 1.253 | 1.264 |
| PERFORMANCE SPEC |  |  |
| RESERVE CAPACITY, min. (Discharge at 25 A, 80° F. to 10.5 V) | 90 | 90 |
| TEST DATA |  |  |
| (1) 16 hr. Rest After Formation ACID | 1.233 | 1.262 |

TABLE II-continued

|  | STD. BATTERIES | BATTERIES WITH OZONATED POSITIVES |
|---|---|---|
| CONC., avg. s.g. |  |  |
| RESERVE | 69.7 | 101.0 |
| CAP., min. | 68.4 | 103.0 |
| (2) 40 hr. Rest After Formation |  |  |
| ACID CONC., avg. s.g. | 1.226 | 1.262 |
| RESERVE | 62.7 | 104.0 |
| CAP., min. | 63.0 | 106.0 |

The reserve capacity performance data of the Table II batteries confirms the significantly enhanced initial capacity of batteries having ozone-treated positive plates. The average initial reserve capacity of the treated batteries exceeds that of the standard batteries by well over 50% despite a 10% smaller total formation charge. In all cases, the treated batteries exceed the specified reserve capacity while the standard batteries fall far short of the specified performance and can be made to meet the specification only by subsequent cycling (discharge and recharge). As also shown in the Table II data, there is an appreciable loss in capacity in the standard batteries during an open circuit rest after formation (commonly referred to as self-discharge). As indicated, two batteries of each group were capacity tested after a 16 hour rest and the other two of each group were tested after a 40 hour rest. The capacity loss in the two later tested standard batteries was about 9%. By comparison, the two later tested ozone-treated batteries actually showed slight open circuit gains in capacity. Self-discharge in the standard batteries is believed to be attributable primarily to the incomplete conversion of residual PbO to $PbO_2$ during formation. This is confirmed by the consumption of acid in the standard batteries during open circuit rest, as indicated by the substantial decrease in acid specific gravity with time after formation shown in Table II.

It is well known in the lead-acid battery industry that industrial batteries, typically having much larger and thicker plates, are considerably more difficult to form than automotive batteries. Industrial batteries require substantially longer formation time and greater total charge. For example, a small industrial battery having 0.25 inch thick plates and a capacity of 80 amp-hours at an 8 hour rate requires a 68 hour formation time and a charge of 260 amp-hours per pound of positive active material when formed in acid having an initial specific gravity of 1.185. To test the effectiveness of ozone treatment of positive plates of industrial batteries, three cells were prepared each using an identical 9 plate element comprising 4 positive and 5 negative plates. Prior to formation, the positive plates of one cell were not treated with ozone and those of the other two cells were exposed for 2 hours to an oxygen atmosphere containing 6% by weight ozone. All cells were formed with a substantially reduced charge and capacity tested at the end of formation. The test results are shown in Table III.

TABLE III

|  | Cell 1 | Cell 2 | Cell 3 |
|---|---|---|---|
| OZONATION, hrs. | 0 | 2 | 2 |
| ACID CONCENTRATION, s.g. | 1.185 | 1.185 | 1.245 |
| FORMATION TIME, hrs. | 24 | 24 | 24 |
| FORMATION CHARGE, Ah | 390 | 390 | 390 |
| SPECIFIED CAPACITY (Discharge to 1.75 V @ c/8 rate), min. | 480 | 480 | 480 |
| ACTUAL CAPACITY, min. | 389 | 461 | 576 |

With a substantially reduced formation charge from that typically used (390 Ah instead of 665 Ah), the actual capacity of the untreated cell (Cell 1) reached only b 81% of the specified gravity. The cells having ozone treated positive plates exhibited greatly enhanced formation efficiencies. The treated cell, formed in acid of the same specific gravity as the standard cell, provided 96% of specified capacity immediately after formation. Cell 3 was formed in higher specific gravity acid to test the difficulty typically encountered in forming heavier industrial positive plates in more concentrated acid. The ozone treated positive plates of this cell formed even more efficiently and exhibited an end-of-formation capacity of 120% of the specified rating.

Pasted positive plates typically require an initial flash drying operation to remove excess moisture followed by an extensive curing process. The curing process, which may comprise oven drying at high humidity, steam treatment or both, is required to reduce the free lead content to 5% or less and to provide strength and handleability to the plates for further processing. In addition to enhancing the formation efficiency of positive plates, it has been found that, for thinner automotive-type plates, the surface treatment provided by converting a portion of the paste material to lead dioxide in accordance with the present invention also results in an acceptable reduction in the free lead content and an increase in plate strength comparable to fully cured plates. Table IV summarizes comparative tests on automotive cells having conventionally cured positive plates and ozone treated positive plates for free lead content, plate strength and reserve capacity. All plates were pasted in the same manner and subjected to initial flash drying.

TABLE IV

|  | STANDARD CELLS | OZONE TREATED CELLS |
|---|---|---|
| POS. PLATE TREATMENT | Conventional cure (40 hrs.) (0.5 hr.) | Surface Ozonation |
| % FREE LEAD | 2.0 | 1.9 |
| VIBRATION LOSS, % | 1 | 1 |
| FORMATION TIME, hrs. | 8.7 | 6.9 |
| FORMATION CHARGE, Ah/lb. pos. | 160 | 125 |
| RESERVE CAPACITY, % spec. | 68 | 119 |

The test results summarized in Table IV show that ozone treatment of pasted positive plates for 30 minutes reduces the free lead content in the paste to slightly less than that in pasted positive plates subjected to a conventional curing process of 40 hours. The plate strength, as measured by active material loss during one minute vibration test, was the same for standard and ozonated plates. Finally, the reserve capacity tests show the same high level of initial performance in cells with ozone treated positive plate formed with a substantially reduced charge, whereas the standard cells subjected to a higher formation charge failed to meet the specified initial reserve capacity. The test results show that a brief surface treatment of positive plates in an ozone-enriched atmosphere is an effective alternative to conventional plate curing requiring extensive treatment in a carefully controlled environment.

To further investigate the efficacy of ozone treatment of positive plates as a substitute for conventional plate curing methods and also the effects of ozone treatment as a supplement to conventional curing, a series of automotive-type test cells were prepared and tested immediately after formation for high rate discharge capacity. The test results are summarized in Table V.

TABLE V

| PLATE CURING METHOD | HIGH RATE CAPACITY* | |
| --- | --- | --- |
| | STD. POSITIVES 165 Ah/lb. FORMATION | $O_3$ TREATED POSITIVES 125 Ah/lb. FORMATION |
| Standard cure and Steam treat | 12 | 23 |
| Standard cure | 14 | 21 |
| None (flash dry only) | 0 | 15 |

*Time in seconds to 1.2 V at 650 A, 0° F.

Several significant conclusions may be drawn from the test results shown in Table V. First, ozone tratment of the positive plates substantially enhances initial high rate discharge performance irrespective of the curing method and even in the case where the plates were not cured at all. Further, uncured ozone-treated positives formed with a formation charge 24% less than the standard performed better than both types of standard cured plates. These tests further confirm that ozonation is an effective alternative to conventional plate curing methods.

To prepare freshly pasted positive plates for ozone treatment in accordance with the method disclosed herein, it is only necessary to remove excess moisture from the plate surfaces. Conventional flash drying, consisting of heating the plates in an oven operated at 360° to 480° C. for 15 to 30 seconds, has been found to provide adequate surface drying. The particular drying process is not critical and freshly pasted plates could also be air-dried, supplemented by the heat of the exothermic reaction inherently occurring in the active material. However, if plates are fully cured prior to ozone treatment, it is preferable to humidify the ozone-enriched gas to compensate for the reduced surface moisture in the plates. Thus, in the case of thicker industrial battery plates, where ozonation is not as effective a curing process, conventional curing followed by ozone treatment with a humidified gas is preferred. In the case of thinner plates used in automotive batteries, flash drying typically results in a reduction in moisture to about 10% of the total paste weight. However, that measure is an average water content and the plate surfaces will be somewhat drier.

To batch process the ozone treated automotive battery plates used in the tests tabulated in Table I, five pasted positive plates were placed in a closed chamber and spaced apart with the plate surfaces extending vertically. The ozone-enriched oxygen gas was dispersed into the chamber through perforated tubes submerged in water below the plates. The water adds humidity to the gas which has been found to enhance the reaction in the case where precured and, therefore, drier plates are treated. The gas was passed over the plate surfaces and vented from the top of the chamber to an ozone chamber. The gas contained 3% by weight ozone and was supplied at a rate of 8 standard cubic feet per hour for 30 minutes. The specific application rate was 1.6 standard cubic feet of gas per square foot of plate surface per hour. Because the ozone reacts effectively with the lead oxide at concentrations well below 6%, it is also possible and practicable to recirculate the gas exiting from the treatment chamber.

The ozone-enriched gas may be supplied at substantially varying rates and, because the ozone reaction with the lead oxide commences immediately and progresses at a fairly rapid rate, increasing the rate of supply can reduce residence time substantially. However, it has been found that ozone concentrations higher than 6% have a tendency to cause uneven reactions and areas of localized "burning" on the plate surfaces. Although oxygen gas is the preferred carrier gas, primarily because it is the component often used to generate ozone, air is a suitable alternative.

In lieu of batch treatment, plates may also be continuously processed by the method of the present invention. Continuous treatment is particularly desirable for processing automotive battery plates which are manufactured in large volumes and, most significantly, can be fully cured and provided with a thin surface layer of lead dioxide in a single operation. The plates may be conveyed through a chamber on two spaced carrying chains and the ozone-enriched gas sprayed against the plate surfaces from nozzles located over and under the plates. For plates such as the heavier industrial-type which may be pre-cured prior to ozonation, the gas is preferably humidified to compensate for the low moisture content.

We claim:

1. In the manufacture of a lead-acid battery having cell elements including positive plates constructed of conductive grids with positive active precursor material applied thereto in paste form, the method of improving the formation efficiency of the positive plates comprising the step of exposing the surfaces of the plates to an ozone-enriched gas to convert a thin outer layer of the active precursor material to lead dioxide.

2. The method as set forth in claim 1 including, prior to the recited step, the step of partially drying the plates to reduce the moisture content.

3. The method as set forth in claim 2 wherein the gas is oxygen and the concentration of ozone is not greater than 6% by weight.

4. The method as set forth in claim 3 including the step of applying the gas at a rate of approximately 1.6 standard cubic feet per square foot of plate area per hour.

5. The method as set forth in claim 1 including, prior to the recited step, curing the plates to reduce the free lead content of the active material to less than 5%.

6. The method of preparing freshly paste positive plates of a lead-acid cell or battery for formation comprising the steps of:
  a. drying the plates to reduce the surface moisture content;
  b. passing an ozone-enriched gas over the plate surfaces in an enclosed chamber to oxidize a thin surface layer of lead oxide in the paste to lead dioxide;
  c. withdrawing from the chamber the gas containing unreacted ozone; and, d. recirculating the gas to the chamber for further oxidation of the plate surfaces.

7. The method as set forth in claim 6 wherein the initial ozone concentration in the gas is not greater than 6% by weight.

8. The method of preparing freshly pasted positive plates of a lead-acid battery for formation comprising the steps of:

a. flash drying the plates to remove excessive moisture; and b. exposing the plate surfaces to an ozone-enriched gas sufficient to reduce the free lead content of the active material to less than 5% and to convert an outer layer of the material to lead dioxide.

9. The method as set forth in claim 8 wherein the ozone concentration in the gas is not greater than 6% by weight.

10. The method as set forth in claim 9 wherein the gas is oxygen.

* * * * *

UNITED STATES PATENT AND TRADEMARK OFFICE
CERTIFICATE OF CORRECTION

PATENT NO. : 4,656,706
DATED : April 14, 1987
INVENTOR(S) : Basanta K. Mahato and William C. Delaney It is certified that error appears in the above-identified patent and that said Letters Patent are hereby corrected as shown below:

Col. 2, Line 36, "oxide", should be --dioxide--.

Col. 6, Line 13, "only b 81%", should be --only 81%--.

Col. 6, Line 13, "gravity", should be --capacity--.

Col. 8, Line 59, "freshly paste", should be --freshly pasted--.

Signed and Sealed this

First Day of March, 1988

Attest:

DONALD J. QUIGG

Attesting Officer

Commissioner of Patents and Trademarks